United States Patent
Van Der Brug et al.

(10) Patent No.: US 9,532,433 B2
(45) Date of Patent: Dec. 27, 2016

(54) METHODS AND APPARATUS FOR CONTROLLING A LIGHTING FIXTURE UTILIZING A COMMUNICATION PROTOCOL

(71) Applicant: KONINKLIJKE PHILIPS N.V., Eindhoven (NL)

(72) Inventors: Willem Peter Van Der Brug, Best (NL); Cornelis Antonius Verbakel, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 197 days.

(21) Appl. No.: 14/353,886

(22) PCT Filed: Oct. 16, 2012

(86) PCT No.: PCT/IB2012/055615
§ 371 (c)(1),
(2) Date: Apr. 24, 2014

(87) PCT Pub. No.: WO2013/061206
PCT Pub. Date: May 2, 2013

(65) Prior Publication Data
US 2014/0300290 A1    Oct. 9, 2014

Related U.S. Application Data

(60) Provisional application No. 61/551,227, filed on Oct. 25, 2011.

(51) Int. Cl.
H05B 41/16    (2006.01)
H05B 37/02    (2006.01)
H05B 33/08    (2006.01)

(52) U.S. Cl.
CPC .......... *H05B 37/02* (2013.01); *H05B 37/0263* (2013.01); *H05B 33/0845* (2013.01)

(58) Field of Classification Search
CPC .............................. H05B 33/08; H05B 33/02
USPC ............... 315/291, 307, 308, 312, 246, 247, 209 R, 315/276, 185 R
See application file for complete search history.

(56) References Cited

U.S. PATENT DOCUMENTS

| | | | |
|---|---|---|---|
| 4,441,055 A | 4/1984 | Balchjunas et al. | |
| 4,513,224 A | 4/1985 | Thomas | |
| 5,264,823 A | 11/1993 | Stevens | |
| 5,471,119 A | 11/1995 | Ranganath et al. | |

(Continued)

FOREIGN PATENT DOCUMENTS

| | | |
|---|---|---|
| JP | 2006330708 A | 12/2006 |
| JP | 2010205733 A2 | 9/2010 |
| JP | 5812292 B2 | 11/2015 |

*Primary Examiner* — Minh D A
(74) *Attorney, Agent, or Firm* — Meenakshy Chakravorty

(57) ABSTRACT

Methods and apparatus for controlling a lighting fixture utilizing a communication protocol transmitted over the power line that feeds the lighting fixture. Data may be transmitted to a plurality of lighting fixtures (40) via altering the output voltage transmitted to the lighting fixture through switching of a transformer (120) connected to the output voltage. Data may be received at a lighting fixture (40) via receiving an encoded output voltage and comparing the voltage level of a plurality of sine cycle periods of the output voltage to determine an incoming data packet. One or more aspects of the lighting fixture (40) may be controlled based on the received data.

20 Claims, 3 Drawing Sheets

(56) References Cited

U.S. PATENT DOCUMENTS

| | | | |
|---|---|---|---|
| 5,614,811 A | 3/1997 | Sagalovich et al. | |
| 5,872,429 A | 2/1999 | Xia et al. | |
| 6,218,787 B1 | 4/2001 | Murcko et al. | |
| 6,608,552 B1 | 8/2003 | Fogel et al. | |
| 2004/0160199 A1* | 8/2004 | Morgan | A01M 1/04 315/312 |
| 2005/0231128 A1 | 10/2005 | Franklin | |
| 2008/0285271 A1* | 11/2008 | Roberge | F21S 8/033 362/235 |
| 2009/0222241 A1* | 9/2009 | Dorogi | G01R 31/44 702/182 |
| 2010/0176733 A1* | 7/2010 | King | H05B 37/0245 315/158 |
| 2010/0277102 A1 | 11/2010 | Lin et al. | |

* cited by examiner

METHODS AND APPARATUS FOR CONTROLLING A LIGHTING FIXTURE UTILIZING A COMMUNICATION PROTOCOL

TECHNICAL FIELD

The present invention is directed generally to control of an apparatus connected to a power line. More particularly, various inventive methods and apparatus disclosed herein relate to controlling a lighting fixture utilizing a communication protocol transmitted over the power line that feeds the lighting fixture.

BACKGROUND

Lighting fixtures have been designed that are capable of receiving control signals for controlling one or more aspects thereof. For example, some lighting fixtures receive control signals that may at least selectively dictate the dimming levels of such lighting fixtures.

One existing solution for transmitting such control signals utilizes one or more stand-alone control wires that extend from a controller to the lighting fixtures. Data packets are then sent over the control wires to control the lighting fixtures. The data packets and communications may conform to a communications protocol such as DMX or DALI. Implementation of such a solution may have one or more drawbacks. For example, such a solution requires the running of one or more separate wires and involves limitations on wiring length and/or wiring method that may not be appropriate for certain applications such as street lighting.

Other existing solutions enable transmitting such control signals without installing new wires. Such solutions utilize wireless control signals or communications over the power wires (PLC). However, implementation of such solutions may have one or more drawbacks. For example, such solutions require specific hardware modems and/or radios to be installed at each individual lighting fixture. Such specific equipment is often overly costly and/or may not be easily installed in existing lighting fixtures or light poles supporting lighting fixtures.

Thus, there is a need in the art to provide methods and apparatus for controlling a lighting fixture utilizing a communication protocol transmitted over the power line that feeds the lighting fixture and that optionally does not require specific hardware modems be installed at the lighting fixture.

SUMMARY

The present disclosure is directed to inventive methods and apparatus for controlling a lighting fixture utilizing a communication protocol transmitted over the power line that feeds the lighting fixture. For example, in some embodiments data is transmitted to a plurality of lighting fixtures via altering the output voltage transmitted to the lighting fixture through switching of a transformer in series with the output voltage. Also, for example, in some embodiments data is received at a lighting fixture via receiving an encoded output voltage and comparing the voltage level of a plurality of partial or full sine cycles of the output voltage to determine an incoming data packet. One or more aspects of the lighting fixture may be controlled based on the received data. Optionally, in some embodiments the communication protocol may be a unidirectional communication protocol. Also, optionally, in some embodiments the communication protocol may be additionally or alternatively utilized to control non-lighting fixture devices.

Generally, in one aspect, a method of transmitting a data packet to a lighting fixture network via manipulation of a transformer is provided. The method includes the steps of receiving data indicative of appropriate lighting fixture settings for one or more lighting fixtures of a lighting fixture network; determining a lighting fixture data packet based on the data; and switching a transformer in series with a line of an output voltage to the lighting fixtures during a plurality of cycle periods of the output voltage. Switching the transformer causes one of a voltage drop and a voltage rise in the output voltage. Switching the transformer is done in correspondence with the data packet such that the at least one of the voltage drop and the voltage rise in the output voltage correspond to the data packet.

In some embodiments, the data indicative of appropriate lighting fixture settings is stored in a memory, and may be transmitted by at least one sensor.

In some embodiments, the at least one of the voltage drop and the voltage rise is less than four volts.

In some embodiments, the cycle periods consist of half-sine cycle periods.

In some embodiments, the method further includes the step of applying eight-to-fourteen modulation to the data packet.

In some embodiments, the cycle periods include only one of positive half cycle periods and negative half cycle periods. In some versions of those embodiments the method further includes determining a second lighting fixture data packet based on the data and switching the transformer during a plurality of the other of the positive half cycle periods and the negative half cycle periods in correspondence with the second lighting fixture data packet.

Generally, in another aspect, a method of determining data packet information based on analysis of an input power waveform and controlling a lighting fixture based on the data packet information is provided. The method includes the steps of oversampling an input power waveform; comparing a voltage level of a plurality of sine cycle periods of the input power waveform; determining an incoming data packet based on which of the sine cycle periods have a reduced voltage level and which have a non-reduced voltage level; and controlling at least one aspect of a lighting fixture based on the incoming data packet.

In some embodiments, the difference between the reduced voltage level and the non-reduced voltage level is less than two volts.

In some embodiments, a dimming level of the lighting fixture is controlled based on the incoming data packet. In some versions of those embodiments the method further includes waiting an amount of time for an additional data packet pertaining to the dimming level. If the additional data packet is not received within the amount of time, the method includes causing the lighting fixture to operate at a default dimming level or revert to another method of control. Optionally, the default dimming level is full light output.

In some embodiments, the method further includes decoding the incoming data packet based on a decoding scheme. In some versions of those embodiments, the decoding scheme involves Reed-Solomon decoding.

In some embodiments, the sine cycle periods include half-sine cycles. In some versions of those embodiments, the half-sine cycles include only one of positive half-sine cycle periods and negative half-sine cycle periods.

Generally, in another aspect, a method of implementing a communication system in a lighting fixture network is provided. The method includes the step of inserting a transformer in series with a line of an output voltage feeding a lighting fixture network. The transformer selectively causes a voltage alteration in the output voltage during a plurality of sine cycle periods of the output voltage in correspondence with an informational data packet. The method further includes the step of implementing software in a controller of a ballast in at least one lighting fixture of the lighting fixture network. The ballast is coupled to the output voltage. The controller monitors the output voltage. The software determines an incoming data packet based on which of the sine cycle periods have the voltage alteration and the controller controls one or more aspect of the lighting fixture based on the incoming data packet.

In some embodiments, the voltage alteration is approximately one volt.

The controller may be a pre-existing controller of the ballast. Also, the transformer may be inserted in a power cabinet of the lighting fixture network.

In some embodiments the sine cycle periods include only one of positive half-sine cycle periods and negative half-sine cycle periods.

Generally, in another aspect, a lighting fixture network having a communication system is provided. The network includes a transformer inserted in series with a phase line of a power line feeding an output voltage to a plurality of lighting fixtures. The transformer includes a controller in communication with at least one switch of the transformer. The controller selectively switches at least one of the switches during a plurality of sine cycle periods of the output voltage in correspondence with an informational data packet. A ballast in at least one of the lighting fixtures receives the output voltage and includes a ballast controller monitoring the output voltage. The ballast controller determines the informational data packet based on which of the sine cycle periods have a voltage alteration caused by selectively switching at least one of the switches. The ballast controller controls one or more aspect of the lighting fixture based on the incoming data packet.

In some embodiments, the ballast further includes an analog to digital converter interposed between the output voltage and the ballast controller.

In some embodiments, the voltage alteration is less than five volts.

In some embodiments, the sine cycles include only one of positive half-sine cycle periods and negative half-sine cycle periods.

In some embodiments the line is a phase line.

In some embodiments the line is a neutral line.

As used herein for purposes of the present disclosure, the term "light-emitting diode" or "LED" should be understood to include any electroluminescent diode or other type of carrier injection/junction-based system that is capable of generating radiation in response to an electric signal.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
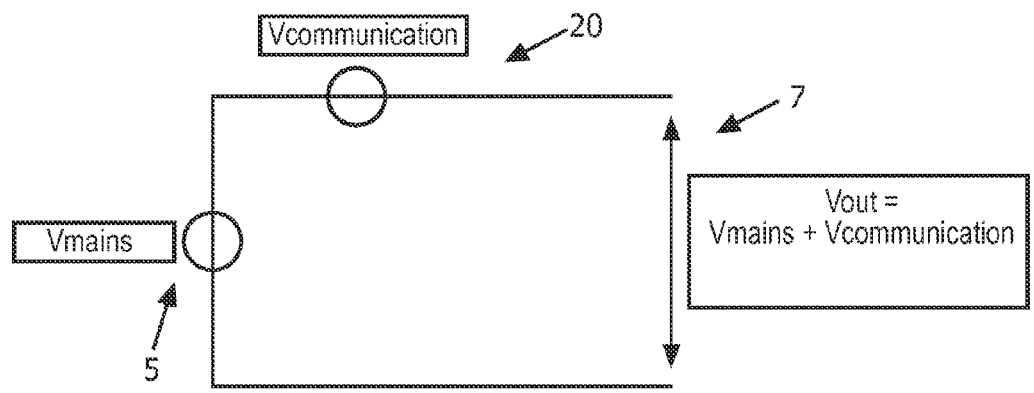
FIG. 1 illustrates a schematic of a communications transformer placed in series with a phase line of a mains power supply.

Lighting fixture control systems have been designed that utilize control signals for controlling one or more aspects of a lighting fixture. For example, some lighting fixtures are capable of receiving generated data packets that are transmitted over one or more stand-alone control wires that extend from a controller to the lighting fixtures. The data packets and communications may conform to a communications protocol such as DMX or DALI. However, such a solution requires the running of separate wires and involves limitations on wiring configuration that may not be appropriate for certain applications such as street lighting. Other existing solutions enable transmitting such control signals without installing new wires. However, such solutions require specific hardware modems and/or radios to be installed at each individual lighting fixture, which is often overly costly and/or may not be suited for existing lighting fixtures.

Thus, Applicants have recognized a need to provide methods and apparatus for controlling a lighting fixture utilizing a communication protocol transmitted over the power line that feeds the lighting fixture and that optionally does not require specific hardware modems be installed at the lighting fixture.

More generally, Applicants have recognized and appreciated that it would be beneficial to provide methods and apparatus for controlling a lighting fixture or other mains power connected apparatus utilizing a communication protocol.

In view of the foregoing, various embodiments and implementations of the present invention are directed to control of a lighting fixture and/or other apparatus.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the approach disclosed herein are particularly suited for adjusting the dimming level of a street lighting fixture in a street lighting network. Accordingly, for illustrative purposes, the claimed invention is discussed in conjunction with such street lighting network. However, other configurations and applications of this approach are contemplated without deviating from the scope or spirit of the claimed invention. For example, in some applications the approach may be implemented in an indoor lighting environment such as controlling a plurality of indoor lighting fixtures in an office environment.

Referring to FIG. 1, in one embodiment, a communications transformer 20 is placed in series with a line of a mains power supply 5. In some embodiments the line of the mains power supply 5 may be the phase line. The mains power supply 5 may include a mains power supply transformer that is sized to power one or more power connected apparatus, such as lighting fixtures, that are connected to a group output voltage 7. As discussed herein, the communications transformer 20 may be modulated by a controller to thereby modulate the voltage supplied over group output voltage 7 in accord with a data signal. For example, the communications transformer 20 may be modulated during portions of a sine cycle of the voltage supplied by mains power supply 5 to cause a certain voltage drop during such portions of a sine cycle. The voltage drops may correspond to a communications data packet that is to be sent by the communications transformer 20 over the group output voltage 7. The communications transformer 20 only needs to supply the power needed to raise or lower the mains voltage generated by the mains power supply 5. For example, if the communications transformer effectuates a one volt modulation and the mains power supply is two hundred and thirty volts, the power rating of the communications transformer 20 only needs to be $\frac{1}{230}$ of the rating of the mains power supply transformer. Accordingly, in certain embodiments the communications transformer 20 may optionally be of a small size relative to the mains transformer.

Figure 2:
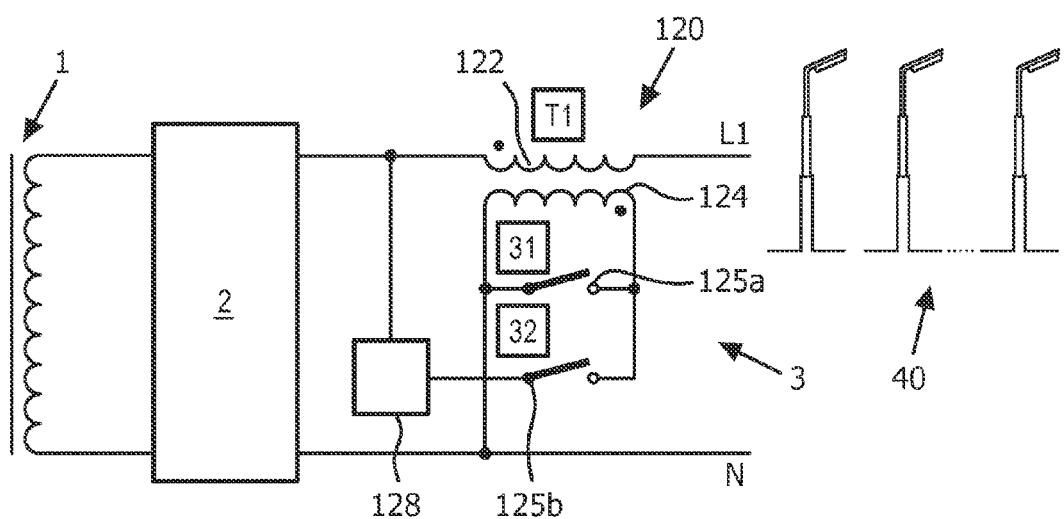
FIG. 2 illustrates a lighting fixture network being fed by a mains supply transformer and including a communications transformer; the communications transformer and the mains supply transformer supply a lighting fixture group output to a group of lighting fixtures.

Referring to FIG. 2, in another embodiment, a communications transformer 120 is illustrated downstream of a mains supply transformer 1 that feeds a distribution panel 2. The mains supply transformer 1 and the distribution panel 2 provide protection, routing, and switching of an output voltage 3 that is supplied over phase line L1 and neutral line N to lighting fixtures 40. The transformer 120 is connected in series with the phase line L1 and includes a primary winding 122 and a secondary winding 124. The secondary winding 124 includes a plurality of electronically actuable switches 125*a*, 125*b* that may be selectively activated to alter the state of the transformer 120. When switch 125*b* is closed and switch 125*a* is open, the transformer 120 is switched on and a voltage is added to the normal output voltage 3. In some embodiments the added voltage may be approximately one volt. In some embodiments the transformer 120 may additionally or alternatively be configured to decrease the voltage relative to the normal output voltage 3 (e.g., by changing the primary winding to secondary winding ratio, by changing the polarity of the connection of transformer 120). When switch 125*a* is also closed, the transformer 120 is short circuited and no voltage is added to the normal output voltage 3 and when switch 125*b* is closed voltage will be added. In some embodiments the switch 125*a* may be omitted. In such embodiments, when the switch 125*b* is opened no voltage will be added to the normal output voltage 3. Also, in some of those embodiments where the switch 125*a* is omitted, the transformer 120 may saturate and form a nonlinear series impedance when the switch 125*b* is opened.

A controller 128 is also illustrated in FIG. 2 that is electronically coupled to the switches 125*a*, 125*b* and that is also electrically coupled to the output voltage 3. The controller 128 selectively activates one or more of the switches 125*a*, 125*b* as described herein to encode a communications data packet in the output voltage 3. For example, in order to transmit a binary data packet, the controller 128 may selectively activate the switch 125*a* during certain half-sine cycles of the input voltage to cause a voltage increase at the lighting fixture group output voltage 3 during those half-sine cycles (thereby representing a binary "high") and not activate the switch 125*a* during other half-sine cycles (thereby representing a binary "low"). Also, for example, in alternative embodiments when activating the transformer causes a voltage drop, in order to transmit a binary data packet, the controller 128 may selectively activate one or more switches during certain half-sine cycles of the input voltage to cause a voltage decrease at the output voltage 3 during those half-sine cycles (thereby representing a binary "low") and not activate the one of the switches during other half-sine cycles (thereby representing a binary "high"). The switch (es) may optionally be activated between immediately successive zero-crossings of the input voltage 1 to thereby provide for voltage alteration during half-sine cycles.

In some embodiments, the transformer 120 may be installed in a feeder pillar or street cabinet associated with a group of street lighting fixtures. In some embodiments the transformer 120 may be small enough to fit on a DIN mounting rail. For example, assuming a 10 kVA string of street lights and a 1 Volt voltage drop/rise on half-sine cycles (or other sine cycle period) to transmit data packets as described herein, the transformer 20 would only need to handle approximately 40 Watts.

In some embodiments, a communications transformer may be provided that includes a primary winding and secondary winding having the same number of turns. One or more taps may be provided, including one or more above normal taps and/or below normal taps, thereby enabling respective of increase and/or decrease in the turn ratio of the windings through electronic switching of the taps and a corresponding increase and/or decrease to the normal output voltage 3 when the communications transformer is activated.

Turning to FIG. 2, a first sinusoidal waveform A and a second sinusoidal waveform B are illustrated over two full sine cycles thereof. Sinusoidal waveform A is representative of a output voltage 3 that does not include any encoded data packets and that maintains a substantially constant voltage. Sinusoidal waveform B is representative of a waveform that includes encoded data packets and voltage drops in half-sine cycles thereof. Between the first two zero-crossings of the waveform B (denoted by vertical dashed lines), a voltage drop $\Delta V1$ occurs relative to the waveform A. In some embodiments the voltage drop $\Delta V1$ may be approximately one volt and may be caused via switching of a single switch. In other embodiments other voltage drops may occur and may optionally utilize more than one switch (e.g., may utilize multiple taps associated with one or both windings of the transformer). Between the second and third zero-crossings and the third and fourth zero-crossings, no voltage drop occurs, as can be seen by the waveform A and waveform B substantially mirroring one another. Between the fourth and fifth zero-crossings, a voltage drop $\Delta V2$ occurs relative to the waveform A. In some embodiments the voltage drop $\Delta V2$ may be approximately one volt and may be caused via switching of a single switch of the transformer. Thus, the transmitted waveform B includes a "low" half-sine cycle, followed by two "high" half-sine cycles, then another "low" half-sine cycle. Additional encoded half-sine cycles may continue to be transmitted as desired.

Figures 5, 6:
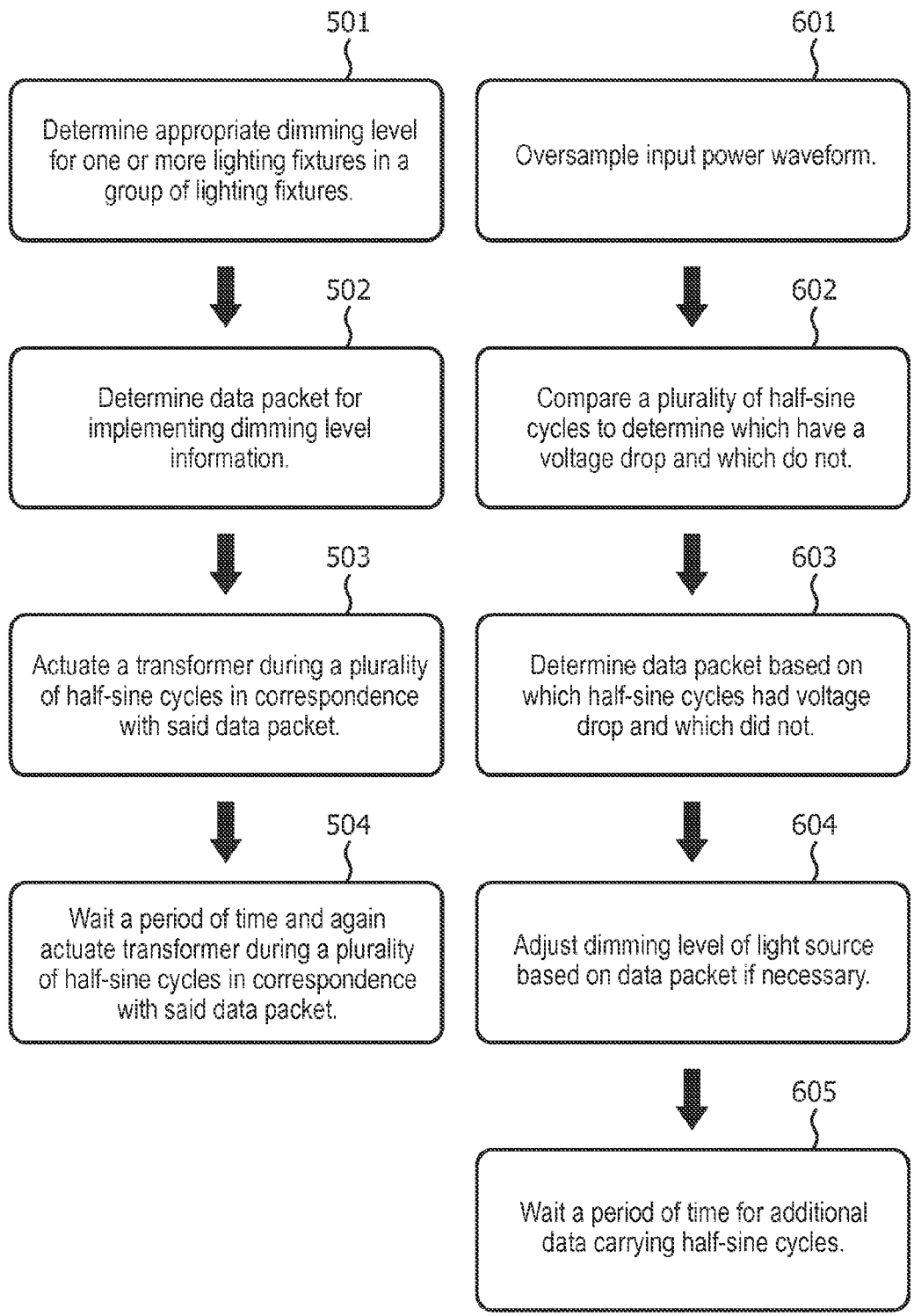
FIG. 5 illustrates an embodiment of determining a data packet and transmitting the data packet via manipulation of a transformer.
FIG. 6 illustrates an embodiment of analyzing an input power waveform and determining data packet information based on the analysis of the input power waveform.

Turning to FIG. 5, an embodiment of a method of determining a data packet and transmitting the data packet via manipulation of a communications transformer is illustrated. The method of FIG. 5 may optionally be performed by controller 128. The method includes the step 501 of determining an appropriate dimming level for one or more lighting fixtures in a group of lighting fixtures. For example, in some embodiments a dimming level for a group of lighting fixtures may be retrieved from a schedule stored in a memory associated with the controller 128. Also, for example, in some embodiments a dimming level may be determined, in whole or in part, via input from one or more sensors such as photo sensors (detecting e.g., ambient light level), proximity sensors (detecting e.g., presence of cars or pedestrians), and/or RF sensors (detecting e.g., signals sent from adjacent lighting fixture networks, signals from a central control system, and/or signals from a vehicle). Although the method of FIG. 5 discusses a dimming level, one of skill in the art, having had the benefit of the present disclosure, will recognize and appreciate that in alternative embodiments additional or alternative aspects of a lighting fixture may be controlled. For example, in some embodiments color output of a LED-based light source of the lighting fixture may be controlled and/or which of a plurality of light sources of a lighting fixture are activated may be controlled. Control information may be directed to one or more addressable lighting fixtures by encoding address data therein and/or may be directed to all lighting fixtures in a group.

At step 502, a data packet for implementing the dimming level information is determined. For example, if the desired dimming level is a medium dimming level, that dimming level information is incorporated into a data packet including a plurality of bytes. For example, the data packet may include twenty-four bits: an eight bit start code; an eight bit dimming code (incorporating medium dimming instructions); and an eight bit end code. The data packet may optionally employ one or more techniques to increase robustness. For example, in some embodiments eight-to-fourteen modulation (EFM) encoding may be utilized, such that the encoding of half-sine cycles is changed regularly. In other words, the encoding may ensure that no more than a few succeeding half-sines have the same voltage level, thereby making it easier for a controller of a lighting fixture to compare successive half-sine cycles to detect voltage levels. Also, for example, in some embodiments Reed-Solomon redundancy padding, CRC checking, a checksum, and/or other encoding may optionally be utilized in the data packet to increase robustness. For example, Reed-Solomon may be utilized when it is desired to add redundant information to a data packet with the intent to handle bit errors in transmission and/or reception of the data packet.

Also, for example, in some embodiments encoding methods for the data packet may be utilized where data frames with N bits are mapped to transmit frames with M bits, where M is greater than N. Such encoding methods may add redundant bits to the data packet by mapping the data packet to codes which all have only short sequences of 0's and 1's. Such encoding methods may provide one or more benefits. For example, such encoding methods may enable low frequency avoidance by only using transmit frames with short sequences of 0's and 1's. Also, for example, such encoding methods may enable error detection by identifying when a transmit code that is not being used is received since there are more transmit frame codes ($2^M$) compared to the number of data frames ($2^N$). Also, for example, such encoding methods may enable transient error correction by selecting the closest matching transmit code to correct a bit error. Also, for example, such encoding methods may enable burst error recovery by enabling identification of an amplitude change on the mains voltage when multiple (e.g., three or more) consecutive bits at the receiver side are interpreted as 0's or 1's. The receiver may, in response to interpreting multiple consecutive bits as 0's or 1's, adjust time constants of the apparatus utilized to detect voltage averages to speed recovery from such a burst error situation. Also, for example, such encoding methods may enable synchronization by checking the error count on all M possible alignments of the incoming data and identifying the alignment with the lowest error count as the correct alignment.

As an example of an encoding method that may be utilized, 6 redundant bits could be added to 4 data bits to produce a set of 10-bit codes. The 16 possible values of 4 bits of data could be mapped to the set of 10-bit codes using the encoding scheme shown below.

| | |
|---|---|
| 0 → 155 | (0010011011) |
| 1 → 173 | (0010101101) |
| 2 → 182 | (0010110110) |
| 3 → 213 | (0011010101) |
| 4 → 299 | (0100101011) |
| 5 → 309 | (0100110101) |
| 6 → 333 | (0101001101) |
| 7 → 339 | (0101010011) |
| 8 → 358 | (0101100110) |
| 9 → 587 | (1001001011) |
| 10 → 598 | (1001010110) |

In the example, no 10-bit code contains more than two consecutive 0's or 1's. Accordingly, a data packet transmitting such a code should not cause undesirable disturbances in the power supply to connected devices. The 10-bit codes are also sufficiently different from one another to provide for correction of 2 bits by selecting the closest matching transmission code. The 10-bit codes also provide for synchronization. Any two consecutively transmitted 10-bit codes will be decoded without errors ONLY if the decoder is correctly synchronized. For example, if the controller tries to decode 10 bits from a received series of bits, but the ten bits under consideration comprise the last 5 bits from one 10-bit code and the first 5 bits from the next 10-bit code, the controller will detect an error because those bits will not correspond to one of the 10-bit codes in the set. In such a case the controller will keep 'moving' along the received series of bits, one bit at a time, until the ten bits under consideration are found to correspond to one of the 10-bit codes in the set. The controller will then be synchronized to the received bit stream.

At step 503, the transformer 120 is switched on during a plurality of half-sine cycles in correspondence with the data packet. In some embodiments the transformer may be switched via actuation of one or more switches 125a. For example, in some embodiments one of the switches 125a may be actuated during half-sine cycles that are to correspond with a data high and may not be actuated during half-sine cycles that are to correspond with a data low. Optionally, the data packet may be encoded on a plurality of continuous half-sine cycles. In other embodiments one or more non-encoded half-sine cycles may be interposed within the data packet.

In some embodiments the data packet may be encoded only on either a plurality of positive half cycles or a plurality of negative half cycles. For example, in some embodiments one of the switches 125a may be actuated during positive half-sine cycles that are to correspond with a data high and may not be actuated during positive half-sine cycles that are to correspond with a data low. In such embodiments the switches will not be actuated in accordance with the data packet during negative half-sine cycles. In such embodiments the negative half-sine cycles may not carry any data or may instead carry a separate data packet. For example, in some embodiments the data packet may be encoded only on the positive half-sine cycles and a second data packet may be encoded only on the negative half-sine cycles.

The negative half-sine cycles and the positive half-sine cycles may be seen as two completely independent communication channels. Synchronization, packet decoding, redundancy coding and command coding (timing and/or state of the channel), and/or data payload may be handled separately between the independent communication channels. Also, the two independent communication channels may optionally be in two different states. For example, the positive half cycle channel may be synchronized and utilized for decoding and executing commands, while the negative channel is in a state where it is not yet utilized for identifying false and true amplitude levels. In some embodiments encoding a data packet on only one of a plurality of positive half cycles or a plurality of negative half cycles may make the data communication more robust to noise caused by an asymmetric load. For instance, a DC load that utilizes a diode to reduce power may only carry current in one of the positive or negative half cycles (dependent on diode polarization), which may cause asymmetric amplitude variation when the DC load is in a reduced power state. If such a load reduces the positive half cycles by 5 volts (via resistive loss) and the negative half cycles by 0 volts, then a data packet sent on both the positive half cycles and the negative half cycles that utilizes a voltage drop of 2 volts to transmit data will be corrupted by such asymmetric amplitude variation. If, however, the data packet is sent only on the positive half cycles or only on the negative half cycles and utilizes a voltage drop of 2 volts, the data packet will not be corrupted.

At step 504, the output voltage may be transmitted un-encoded for a period of time and the transformer 120 may then again be switched during a plurality of half-sine cycles in correspondence with the data packet. The data packet may be continuously transmitted (optionally after a period of time) in certain embodiments where lighting fixtures will revert back to a previous or default state unless data packets are retransmitted. For example, in some embodiments the dimming level will be transmitted approximately every five minutes. If a lighting fixture does not receive a renewed dimming level instruction within six minutes of the most recent dimming level instruction, then that lighting fixture may revert back to a previous or default state (e.g., utilizing a preloaded schedule) until another dimming level instruction is received.

Figure 3:
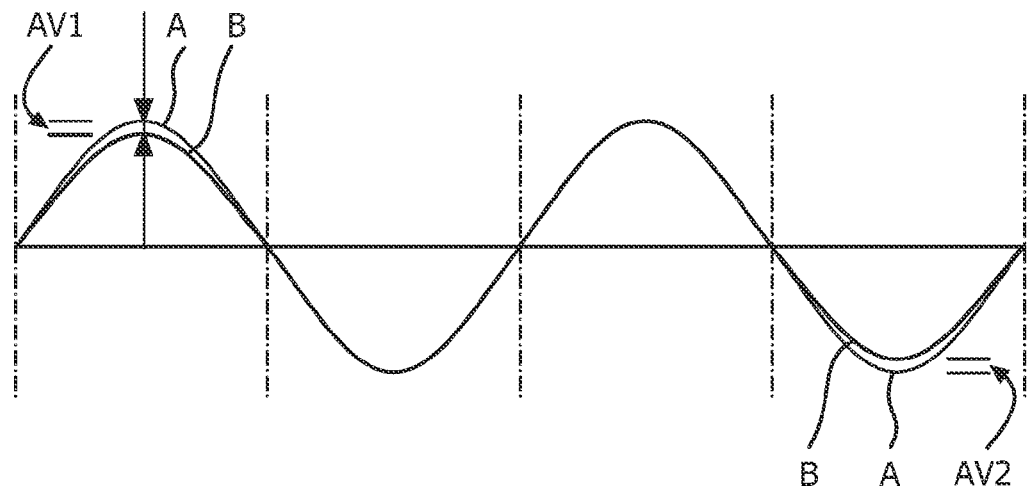
FIG. 3 illustrates a first and second sinusoidal voltage waveform over a portion of the cycles thereof.
Figure 4:
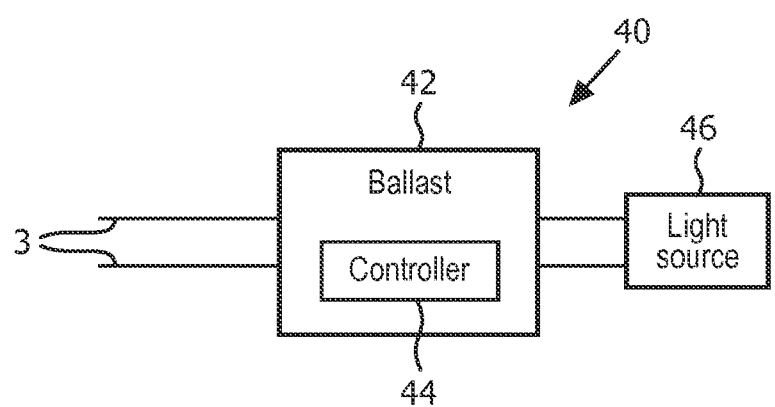
FIG. 4 illustrates an embodiment of a lighting fixture that may be electrically coupled to the group output voltage of FIG. 1 or 2.

FIG. 4 illustrates an embodiment of a lighting fixture 40 that is electrically coupled to the lighting fixture group output voltage 3 of the transformer 120 of FIG. 2. The lighting fixture 40 includes a ballast 42 that receives the lighting fixture group output voltage 3. The ballast 42 includes a controller 44 that monitors the lighting fixture group output voltage 3. In some embodiments an analog to digital converter may be interposed between the controller 44 and the lighting fixture group output voltage 3. The controller 44 may optionally oversample the lighting fixture group output voltage 3 received via the analog to digital converter to achieve an accuracy that is greater than the resolution that can be achieved by the analog to digital converter alone. The controller 44 may then compare half-sine cycles to detect which half-sine cycles were affected by a voltage drop or voltage rise and which ones were not. For example, if waveform B of FIG. 3 were transmitted across the lighting fixture group output voltage 3, the controller 44 could determine that a "low" half-sine cycle, followed by two "high" half-sine cycles, then another "low" half-sine cycle were present at the lighting fixture group output voltage 3. The controller 44 may control one or more aspects of the lighting fixture 40 based on received encoded power from lighting fixture group output voltage 3. For example, if dimming level encoded data is received, the controller 44 may cause ballast 42 to operate the light source 46 at the transmitted dimming level.

In some embodiments, the controller 44 and analog to digital converter may be similar to hardware currently utilized in lamp ballasts (e.g., to measure the lighting fixture group output voltage 3). In some versions of those embodiments updated software may be installed on an existing controller 44. In other versions of those embodiments the controller 44 and/or ballast may be new. Utilization of modified hardware that is similar to hardware currently utilized in lamp drivers may enable easy incorporation of the modified hardware in existing fixtures.

Turning to FIG. 6, an embodiment of a method of analyzing an input power waveform and determining data packet information based on the analysis of the input power waveform. The method of FIG. 6 may optionally be performed by controller 44. The method includes the step 601 of oversampling the input power waveform transmitted via lighting fixture group output voltage 3. As discussed, the input power waveform may optionally first be altered by an analog to digital converter prior to oversampling.

At step 602, a plurality of half-sine cycles are compared to determine which of those cycles have a voltage drop and which do not. For example, in some embodiments each successive half-sine cycle will be analyzed to determine whether it has a voltage drop or no voltage drop. Also, for example, in some embodiments every fourth half-sine cycle will be analyzed to determine whether it has a voltage drop or no voltage drop. In other embodiments a plurality of half-sine cycles are compared to determine which of those cycles have a voltage rise and which do not.

Also, for example, in some embodiments only each positive half-sine cycle will be analyzed to determine whether it has a voltage drop or no voltage drop or only each negative half-sine cycle will be analyzed to determine whether it has a voltage drop or no voltage drop. For example, in some embodiments the data packet may be encoded only on the positive half-sine cycles and only the positive half-sine cycles analyzed to determine the data packet. Also, for example, in some embodiments a first data packet may be encoded only on the positive half-sine cycles and only the positive half-sine cycles analyzed to determine the first data packet. A second data packet may be encoded only on the negative half-sine cycles and only the negative half-sine cycles analyzed to determine the second data packet. The negative half-sine cycles and the positive half-sine cycles may be seen as two completely independent communication channels. Synchronization, packet decoding, redundancy coding and command coding (timing and/or state of the channel), and/or data payload may be handled completely separately between the independent communication channels. Also, the two independent communication channels may optionally be in two completely different states.

In some embodiments a low pass filter and/or other apparatus may be utilized to average the received input power waveform and the average may be utilized in determination of whether a half cycle has a voltage drop or a voltage rise. An unwanted sudden change of amplitude in the AC mains voltage will slowly increase or decrease this average, which may cause a temporary error in the determination of whether a half cycle has a voltage drop or a voltage rise. Such errors would persist until the low pass filter has adjusted to the new normal average value. In some implementations the low pass filter may be adjusted to speed-up adjustment of the normal average value, in response to detecting a sudden change of amplitude in the AC mains voltage. Such a sudden change in amplitude of the AC mains may be identified when multiple sequential bits at the receiver side are interpreted as 0's or 1's when encoding methods have been utilized to map the data packet to codes which all have only short sequences of 0's and 1's. The receiver may, in response to interpreting multiple sequential bits as 0's or 1's, adjust time constants of the apparatus utilized to detect voltage averages to speed recovery from such a burst error.

At step 603, the transmitted data packet is determined based on which of the half-sine cycles had a voltage drop and which did not. For example, the voltage drop packets may be interpreted as digital lows and the non-voltage drop packets may be interpreted as digital highs. Optionally, the received packets may be decoded and/or corrected utilizing one or more algorithm such as Reed-Solomon, CRC checking, checksum, and/or forward error correction. For example, if the data packet was transmitted utilizing Reed-Solomon encoding it may be decoded utilizing a Reed-Solomon algorithm.

At step 604, the dimming level of the light source 46 is adjusted based on the data packet if necessary. For example, the data packet may include one or more bits that are indicative of a dimming level. If such a diming level differs from the current dimming level, then the dimming level of the light source 46 may be adjusted via ballast 42.

At step 605, the controller 44 may optionally wait a period of time for additional data carrying half-sine cycles to be transmitted. For example, the data packet may be continuously transmitted (optionally after a period of time) in certain embodiments and the lighting fixtures will revert back to a previous or default state unless data packets are received within a certain time period. For example, in some embodiments the dimming level will be transmitted approximately every minute. If a lighting fixture does not receive a renewed dimming level instruction within a minute of the most recent dimming level instruction, then controller 44 may cause the ballast 42 to gradually revert to driving the light source 46 at a full output power. Optionally, in some embodiments full output power may be the default when no dim signal is detected via the data packet. In combination with optional cabinet level switching of the mains power during the day, such a solution may be very robust to error situations with data packet transmission. Also, in some alternative embodiments other lighting controls may additionally or alternatively operate the lighting fixture if a lighting fixture does not receive a renewed dimming level instruction within a certain amount of time or otherwise loses proper communication with output from transformer 120. For example, the lighting fixture may by default be controlled in response to, inter alia, an output of a daylight sensor of the lighting fixture.

Although the method of FIG. 6 discusses a dimming level, one of skill in the art, having had the benefit of the present disclosure will recognize and appreciate that in alternative embodiments additional or alternative aspects of a lighting fixture may be controlled. For example, in some embodiments color output of the lighting fixture may be controlled and/or which light sources of a lighting fixture are activated may be controlled.

Although the methods of FIGS. 5 and 6 discuss manipulation of voltage during a plurality of half-sine cycles, one of skill in the art, having had the benefit of the present disclosure will recognize and appreciate that in alternative embodiments additional or alternative periods of a sine cycle may be utilized. For example, in some embodiments manipulation may occur over quarter-sine cycles, three-quarter-sine cycles, and/or more than one sine cycle (e.g. one-and-a-half-sine cycles). For example, in some embodiments manipulation may alternatingly occur over half-sine cycles and three-quarter-sine cycles. Controller 128 may properly be configured to transmit any such alternative sine-cycle periods and controller 44 may be properly configured to receive and analyze any such alternative sine-cycle periods.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed limiting the claims in any way.

In the claims, as well as in the specification above, all transitional phrases such as "comprising," "including," "carrying," "having," "containing," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method of transmitting a data packet to a lighting fixture network via manipulation of a transformer, comprising:
   receiving data indicative of appropriate lighting fixture settings for one or more lighting fixtures of the lighting fixture network;
   determining a lighting fixture data packet based on said data;
   switching the transformer in series with a line of an output voltage provided to said lighting fixtures during a plurality of cycle periods of said output voltage;
   wherein switching said transformer causes one of a voltage drop and a voltage rise in said output voltage; and
   wherein the switching of said transformer encodes into said output voltage said data packet such that said at least one of said voltage drop and said voltage rise in said output voltage conveys said data packet.

2. The method of claim 1, wherein said data indicative of appropriate lighting fixture settings is stored in a memory.

3. The method of claim 1, wherein said data indicative of appropriate lighting fixture settings is transmitted by at least one sensor.

4. The method of claim 1, wherein said at least one of said voltage drop and said voltage rise is less than four volts.

5. The method of claim 1, wherein said cycle periods consist of half-sine cycle periods.

6. The method of claim 1, wherein said cycle periods include only one of positive half cycle periods and negative half cycle periods.

7. The method of claim 6, further comprising determining a second lighting fixture data packet based on said data and switching said transformer during a plurality of the other of said positive half cycle periods and said negative half cycle periods in correspondence with said second lighting fixture data packet.

8. The method of claim 1, further comprising applying eight-to-fourteen modulation to said data packet.

9. A lighting fixture controller arranged to receive an output voltage as an input power waveform for determining data packet information based on analysis of the input power waveform and controlling a lighting fixture based on the data packet information, the controller being configured to perform operations comprising:
   oversampling the input power waveform;
   comparing a voltage level of a plurality of sine cycle periods of said input power waveform;
   determining an incoming data packet based on which of said sine cycle periods have a altered voltage level and which have a non-altered voltage level; and
   controlling at least one aspect of the lighting fixture based on said incoming data packet.

10. The lighting fixture controller of claim 9, wherein the difference between said altered voltage voltage level and said non-altered voltage level is less than two volts.

11. The lighting fixture controller of claim 9, wherein a dimming level of said lighting fixture is controlled based on said incoming data packet.

12. The lighting fixture controller of claim 11, wherein the controller is configured to wait an amount of time for an additional data packet pertaining to said dimming level and wherein if said additional data packet is not received within said amount of time, the controller controls said lighting fixture to operate at a default dimming level.

13. The lighting fixture controller of claim 12, wherein said default dimming level is full light output.

14. The lighting fixture controller of claim 9, wherein said operations further comprise decoding said incoming data packet based on a decoding scheme.

15. A method of implementing a communication system in a lighting fixture network, comprising:
   inserting a transformer in series with a line of an output voltage feeding a lighting fixture network, said transformer selectively causing a voltage alteration in said output voltage during a plurality of sine cycle periods of said output voltage in correspondence with an informational data packet;
   implementing software in a controller of a ballast in at least one lighting fixture of said lighting fixture network, said ballast being coupled to said output voltage;
   wherein said controller monitors said output voltage;
   wherein said software determines an incoming data packet based on which of said sine cycle periods have said voltage alteration; and
   wherein said controller controls one or more aspects of said lighting fixture based on said incoming data packet.

16. The method of claim 15, wherein said controller is a pre-existing controller of said ballast.

17. The method of claim 15, wherein said transformer is inserted in a power cabinet of said lighting fixture network.

18. The method of claim 15, wherein said sine cycle periods include only one of positive half-sine cycle periods and negative half-sine cycle periods.

19. A lighting fixture network having a communication system, comprising:
   a transformer inserted in series with a line of a power line feeding an output voltage to a plurality of lighting fixtures, said transformer including a controller in communication with at least one switch of said transformer;
   said controller selectively switching said at least one switch during a plurality of sine cycle periods of said output voltage in correspondence with an informational data packet;
   a ballast in at least one of said lighting fixtures, said ballast receiving said output voltage and including a ballast controller monitoring said output voltage;
   wherein said ballast controller determines said informational data packet based on which of said sine cycle periods have a voltage alteration caused by selectively switching said at least one switch; and
   wherein said ballast controller controls one or more aspects of said lighting fixture based on said informational data packet.

20. The system of claim 19, wherein said ballast further includes an analog to digital converter interposed between said output voltage and said, ballast controller.

* * * * *